United States Patent
Chin et al.

(10) Patent No.: US 9,204,410 B2
(45) Date of Patent: Dec. 1, 2015

(54) METHOD AND APPARATUS FOR REPEATING UPLINK SYNCHRONIZATION IN TIME DIVISION SYNCHRONOUS CODE DIVISION MULTIPLE ACCESS (TD-SCDMA) NETWORKS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 13/384,158

(22) PCT Filed: Apr. 26, 2010

(86) PCT No.: PCT/US2010/032450
§ 371 (c)(1),
(2), (4) Date: Jan. 13, 2012

(87) PCT Pub. No.: WO2011/043843
PCT Pub. Date: Apr. 14, 2011

(65) Prior Publication Data
US 2012/0182975 A1    Jul. 19, 2012

Related U.S. Application Data

(60) Provisional application No. 61/249,865, filed on Oct. 8, 2009.

(51) Int. Cl.
*H04J 3/06* (2006.01)
*H04W 56/00* (2009.01)

(52) U.S. Cl.
CPC ............................. *H04W 56/0045* (2013.01)

(58) Field of Classification Search
None
See application file for complete search history.

(56) References Cited

U.S. PATENT DOCUMENTS

| 6,094,576 | A | 7/2000 | Hakkinen et al. | |
| 6,954,447 | B2 * | 10/2005 | Grieco et al. | 370/335 |
| 7,164,654 | B2 * | 1/2007 | Hunzinger et al. | 370/230 |
| 8,379,662 | B2 * | 2/2013 | Imamura et al. | 370/445 |
| 8,711,765 | B2 * | 4/2014 | Bertrand et al. | 370/328 |
| 2003/0076812 | A1 | 4/2003 | Benedittis | |
| 2005/0053049 | A1 * | 3/2005 | Blanz et al. | 370/350 |
| 2007/0254656 | A1 * | 11/2007 | Dalsgaard | 455/435.1 |
| 2008/0075036 | A1 * | 3/2008 | Bertrand et al. | 370/328 |

(Continued)

FOREIGN PATENT DOCUMENTS

| CN | 1314747 A | 9/2001 |
| CN | 1401197 A | 3/2003 |

(Continued)

OTHER PUBLICATIONS

International Search Report and Written Opinion—PCT/US2010/032450, International Search Authority—European Patent Office—Jun. 28, 2010.

(Continued)

*Primary Examiner* — Phirin Sam
(74) *Attorney, Agent, or Firm* — Kristine U. Ekwueme

(57) ABSTRACT

A method, an apparatus, and a computer program product for wireless communication are provided in which a first synchronization signal to access to a Node B is transmitted; a request signal from the Node B requesting a second synchronization signal is received; and the second synchronization signal is transmitted to the Node B.

48 Claims, 9 Drawing Sheets

(56) References Cited

U.S. PATENT DOCUMENTS

| | | |
|---|---|---|
| 2008/0247337 A1 | 10/2008 | Li et al. |
| 2008/0267161 A1* | 10/2008 | Bertrand et al. ............. 370/347 |
| 2008/0291878 A1* | 11/2008 | Zhang et al. ................. 370/336 |
| 2008/0294784 A1* | 11/2008 | Wang ............................ 709/228 |
| 2009/0141700 A1* | 6/2009 | Baldemair et al. ........... 370/350 |
| 2009/0303965 A1* | 12/2009 | Yokoyama .................... 370/331 |
| 2009/0316758 A1* | 12/2009 | Ahn et al. ..................... 375/135 |
| 2010/0054237 A1* | 3/2010 | Han et al. ..................... 370/350 |
| 2010/0074202 A1* | 3/2010 | Park et al. .................... 370/329 |
| 2012/0009963 A1* | 1/2012 | Kim et al. ..................... 455/509 |

FOREIGN PATENT DOCUMENTS

| | | |
|---|---|---|
| CN | 1464754 A | 12/2003 |
| EP | 0981221 A2 | 2/2000 |
| EP | 1124347 A2 | 8/2001 |
| WO | WO2007073040 A1 | 6/2007 |
| WO | WO2007111941 | 10/2007 |
| WO | WO2009099796 A1 | 8/2009 |

OTHER PUBLICATIONS

3GPP TS 25.224 version 8.9.0 (Release 8), section 5.3.3.2, "Establishment of uplink synchronization", ETSI TS 125 224 V8.9.0 (Jan. 2011), pp. 45-46.

Taiwan Search Report—TW099113980—TIPO—Mar. 15, 2013.

Taiwan Search Report—TW099113980—TIPO—Nov. 29, 2013.

* cited by examiner

METHOD AND APPARATUS FOR REPEATING UPLINK SYNCHRONIZATION IN TIME DIVISION SYNCHRONOUS CODE DIVISION MULTIPLE ACCESS (TD-SCDMA) NETWORKS

CROSS-REFERENCE TO RELATED APPLICATIONS

This application claims the benefit of U.S. Provisional Patent Application No. 61/249,865, entitled "METHOD AND APPARATUS FOR REPEATING UPLINK SYNCHRONIZATION IN TD-SCDMA NETWORKS," filed on Oct. 8, 2009, which is expressly incorporated by reference herein in its entirety.

BACKGROUND

I. Field

Aspects of the present disclosure relate generally to wireless communication systems, and more particularly, to methods and apparatus for repeating uplink synchronization in time division-synchronous code division multiple access (TD-SCDMA) networks.

II. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

The China Communications Standard Association (CCSA) has published a series of TDD-based 3G standards for TD-SCDMA. In TD-SCDMA systems, the user equipment (UE) needs to perform a random access procedure as the first procedure to contact the network for an uplink (UL) operation. The UL synchronization and random access procedure is defined in the CCSA standards YD/T 1371.5-2008 Technical requirements for Uu Interface of 2 GHz TD-SCDMA Digital Cellular Mobile Communication Network Physical Layer Technical Specification Part 5: Physical Layer Procedure.

It would be preferable to provide additional UL synchronization and random access procedures to the existing system.

SUMMARY

In an aspect of the disclosure, a method of wireless communication is provided. The method includes transmitting a first synchronization signal to access to a Node B; receiving a request signal from the Node B requesting a second synchronization signal; and transmitting the second synchronization signal to the Node B.

In an aspect of the disclosure, an apparatus for wireless communication includes means for transmitting a first synchronization signal to access to a Node B; means for receiving a request signal from the Node B requesting a second synchronization signal; and means for transmitting the second synchronization signal to the Node B.

In an aspect of the disclosure, a computer program product includes a computer-readable medium including code for transmit a first synchronization signal to access to a Node B; receive a request signal from the Node B requesting a second synchronization signal; and transmit the second synchronization signal to the Node B.

In an aspect of the disclosure, an apparatus for wireless communication includes a processor. The processor is configured to transmit a first synchronization signal to access to a Node B; receive a request signal from the Node B requesting a second synchronization signal; and transmit the second synchronization signal to the Node B.

DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
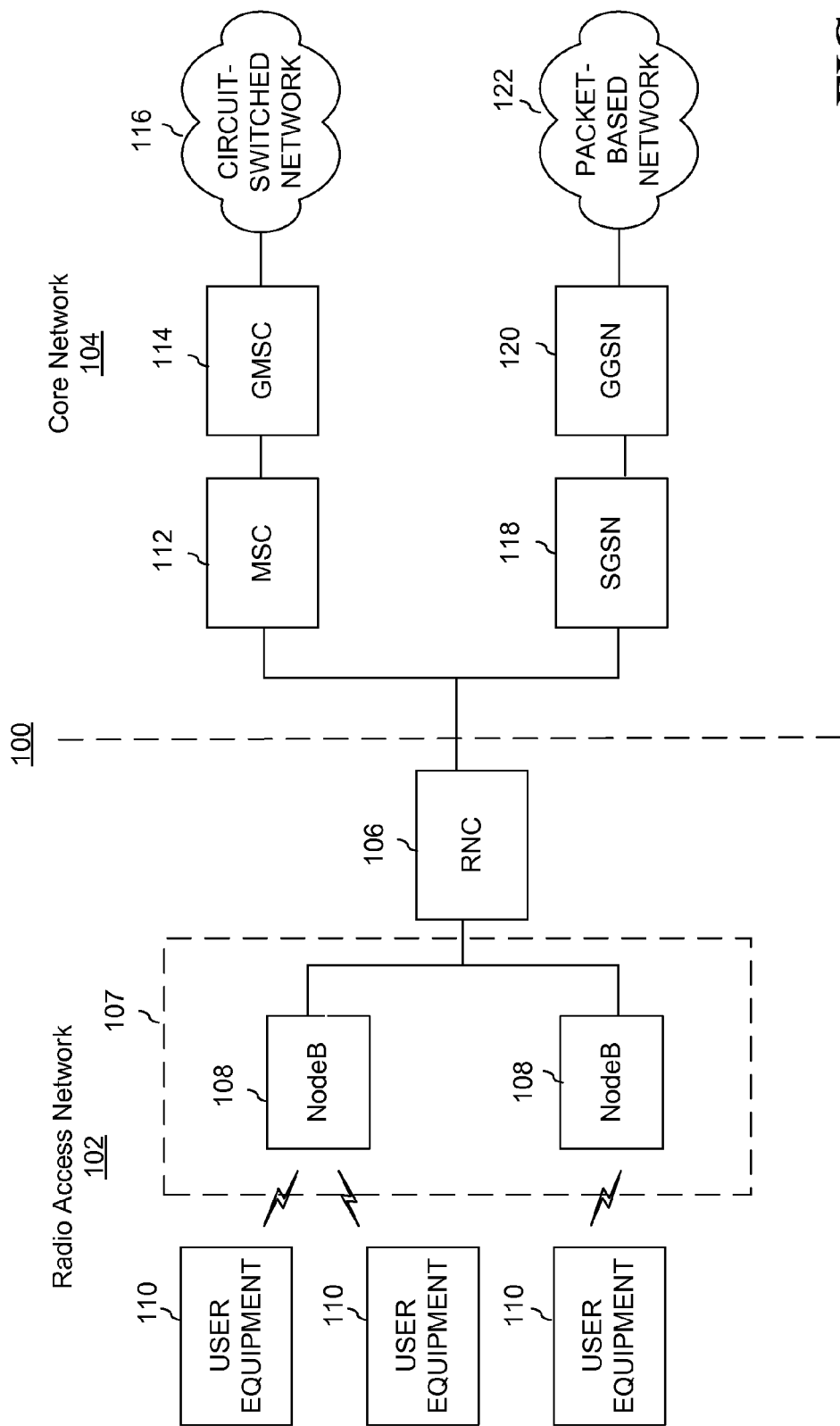
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
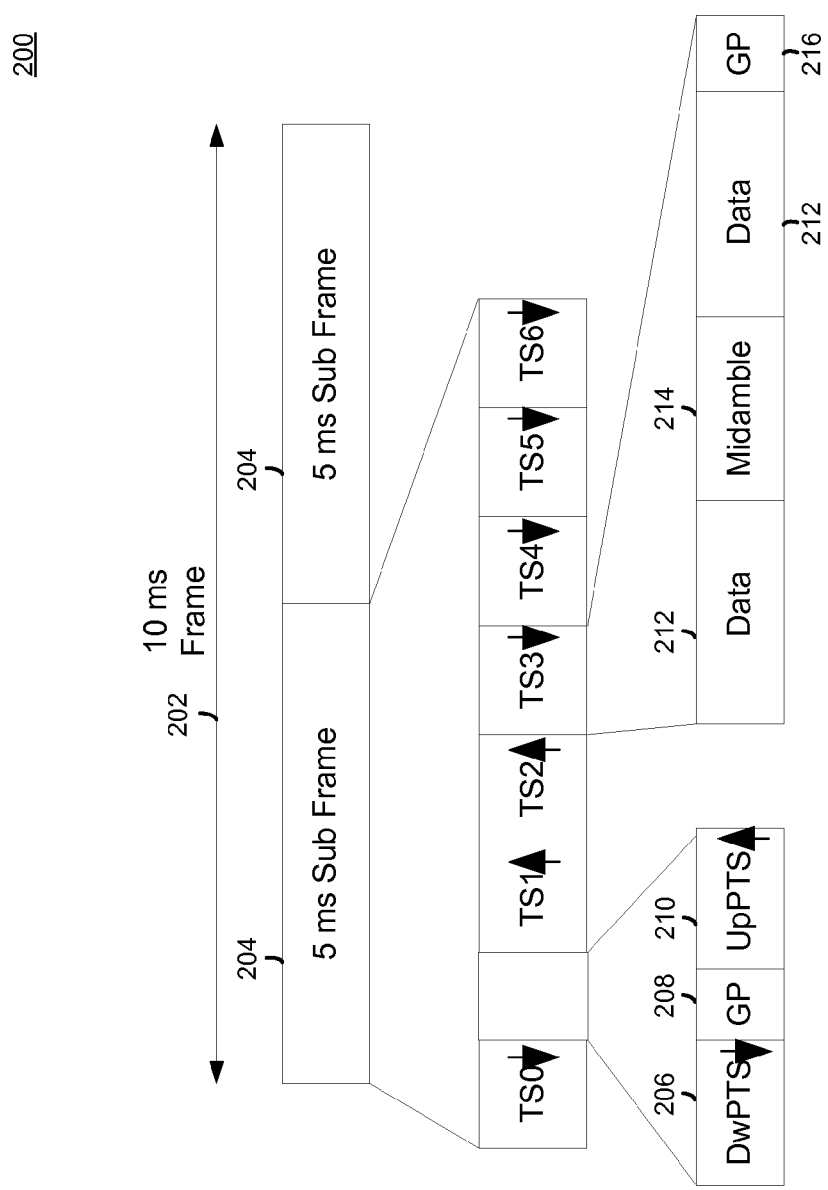
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
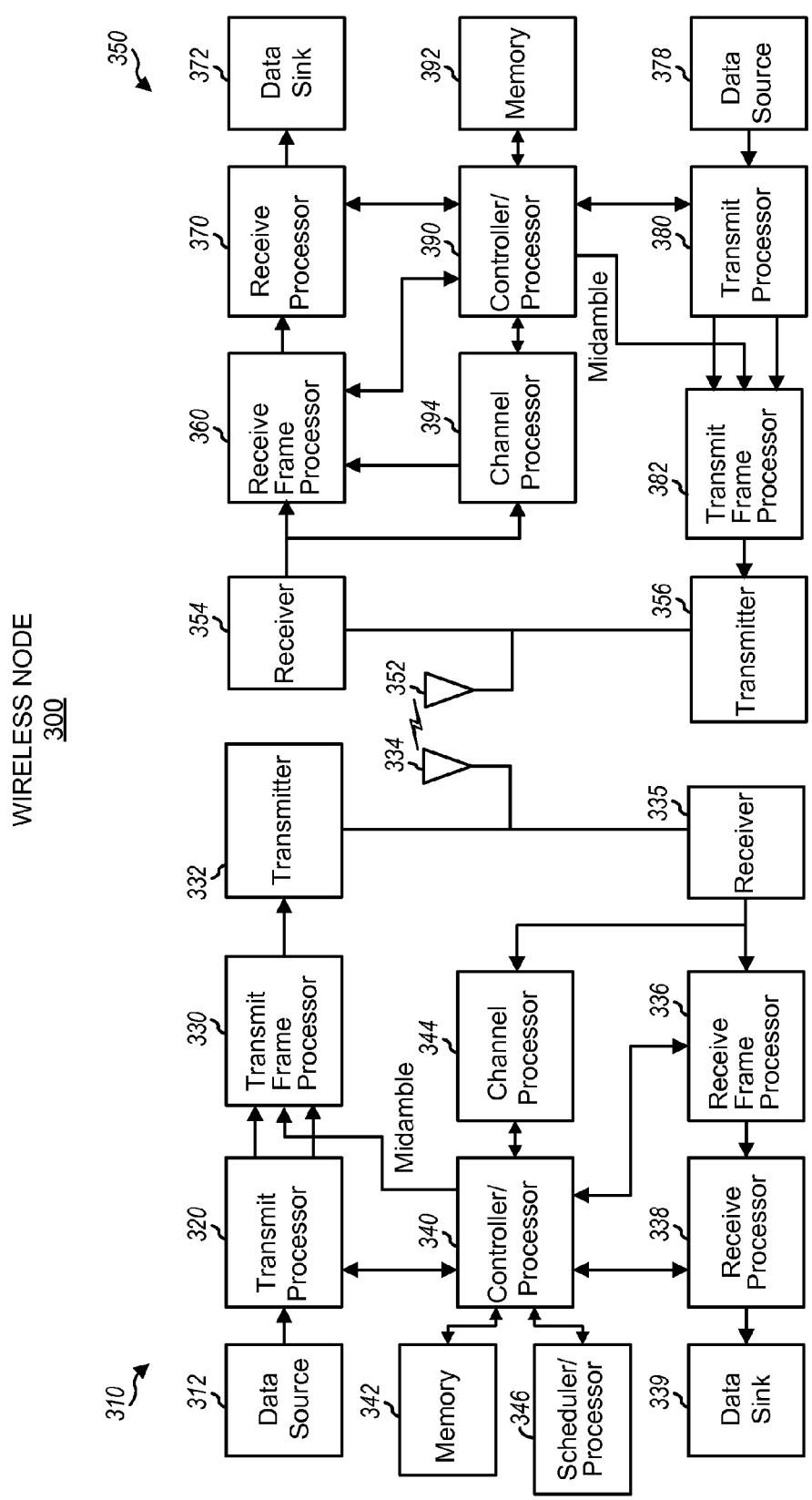
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 202 in FIG. 2, the Node B 310 may be the Node B 208 in FIG. 2, and the UE 350 may be the UE 210 in FIG. 2. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through one or more antennas 334. The one or more antennas 334 may be implemented with beam steering bidirectional adaptive antenna arrays or other similar beam technologies.

At the UE 350, a receiver 354 receives the downlink transmission through one or more antennas 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the one or more antennas 352.

The uplink transmission is processed at the Node B 310 in a manner similar to that described in connection with the receiver function at the UE 350. A receiver 335 receives the uplink transmission through the one or more antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Figure 4:
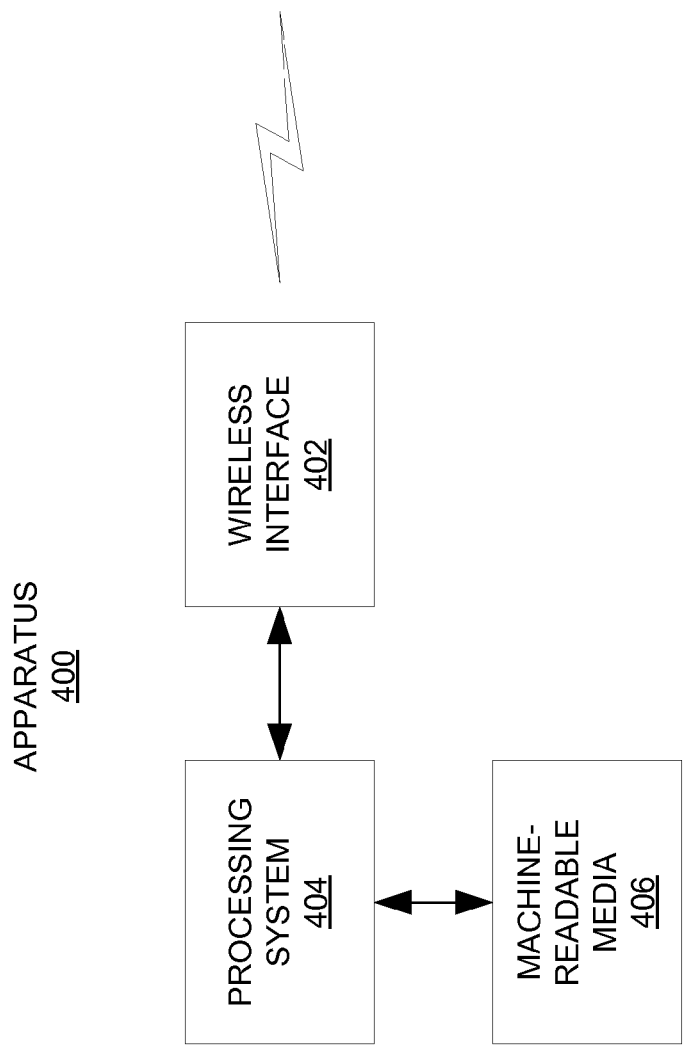
FIG. 4 is a block diagram conceptually illustrating an example of a processing system of the UE of FIG. 3.

FIG. 4 is a block diagram illustrating a configuration for an apparatus 400, which can be a UE 110. The apparatus 400 may include a wireless interface 402, a processing system 404, and machine-readable media 406. The wireless interface 402 may be integrated into the processing system 404 or distributed across multiple entities in the apparatus. The processing system 404 may be implemented with one or more processors. The one or more processors may be implemented with any combination of general-purpose microprocessors, microcontrollers, digital signal processors (DSPs), digital signal processing devices (DSPDs), field programmable gate array (FPGAs), programmable logic devices (PLDs), controllers, integrated circuits (ICs), application specific ICs (ASICs), state machines, gated logic, discrete hardware components, or any other suitable entities that can perform calculations or other manipulations of information.

The processing system 404 is coupled to machine-readable media 406 for storing software. Alternatively, the processing system 404 may itself include the machine-readable media 406. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 404 to perform the various functions described below, as well as various protocol processing functions.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, and/or data can be passed, forwarded, or transmitted using any suitable means including memory sharing, message passing, token passing, and network transmission.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 5:
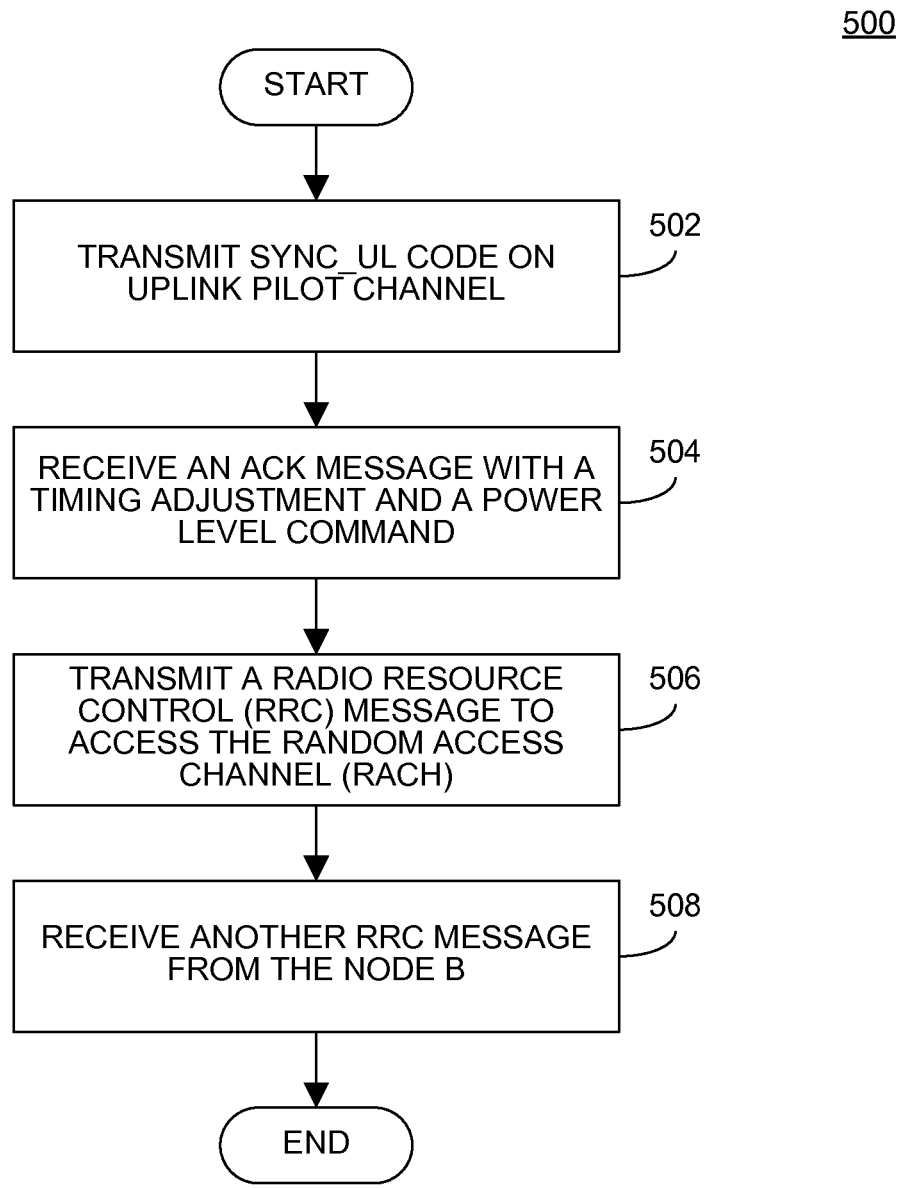
FIG. 5 is a flow diagram of the operation of the communication system using a random access procedure.

In TD-SCDMA network configured in accordance with an aspect of the disclosure, a UE needs to perform a random access procedure for a Node B in order to contact the network for an uplink (UL) operation. The UL random access procedure is defined in the CCSA standards YD/T 1371.5-2008 Technical requirements for Uu Interface of 2 GHz TD-SCDMA Digital Cellular Mobile Communication Network Physical Layer Technical Specification Part 5: Physical Layer Procedure. FIG. 5 illustrates a generalized description of a random access procedure 500 in accordance with the standard.

In step 502, the UE will send a randomly selected code, referred to as a SYNC_UL code, on the Uplink Pilot Channel (UpPCH) to the Node B. In one aspect of the disclosure, a maximum of 8 codes may be available.

In step 504, the UE receives a timing adjustment and a power level command that may be used to send a Random Access Channel (RACH) message on the Fast Physical Access Channel (FPACH) from the Node B, after the Node B has received the SYNC_UL code from step 502. In one aspect of the disclosure, a message may be formed with one or more frames. The FPACH is used by the Node B to carry, in a single burst, the acknowledgement of a detected signature with timing and power level adjustment indication to a UE. In one aspect of the disclosure, the FPACH ACK message has the following format:

| Field | Length | Description |
| --- | --- | --- |
| Signature Reference Number | 3 (MSB) | Indicates SYNC_UL code |
| Relative Sub-Frame Number | 2 | Sub-Frame number preceding the ACK |
| Received starting position of the UpPCH (UpPCHPOS) | 11 | Used for timing correction |
| Transmit Power Level Command for RACH message | 7 | Used for power level command for sending RACH message |
| Reserved bits | 9 (LSB) | N/A |

In step 506, if the UE detects a match of the transmission parameters, such as the subframe index and SYNC_UL code, then the UE may transmit a Radio Resource Control (RRC) message on the corresponding Physical Random Access Channel (PRACH) to the Node B. The RACH is mapped onto one uplink PRACH.

In step 508, the UE receives another RRC message from the Node B after the Node B receives the RRC sent by the UE in step 506.

In the TD-SCDMA system, a few configuration combinations are possible:
- In the Transmission Time Interval (TTI) of the RACH, denoted by L, subframes may be equal to 1 (i.e., 5 ms), 2 (i.e., 10 ms), or 4 (i.e., 20 ms).
- There may be multiple FPACHs, each indexed by a value i, where i=0, 1, ..., M−1.
- Each FPACH(i) may correspond to N(i) PRACHs, N(i)≤L.
- If the UE sends a SYNC_UL code with an index k, where k=0, 1, ..., 7, then the UE listens to the FPACH(i), where i mod M=k.
- The Node B may send an ACK on FPACH(i) on a subframe number SFN' mod L=0, 1, ..., N(i)−1.
- If the UE receives FPACH on subframe number j mod L=n, then it uses PRACH n≤N(i) to transmit to avoid collision.
- Transmission of RACH starts two subframes following FPACH reception. But, if FPACH is received on an odd subframe number and L>1, then three subframes are needed.

Figure 6:
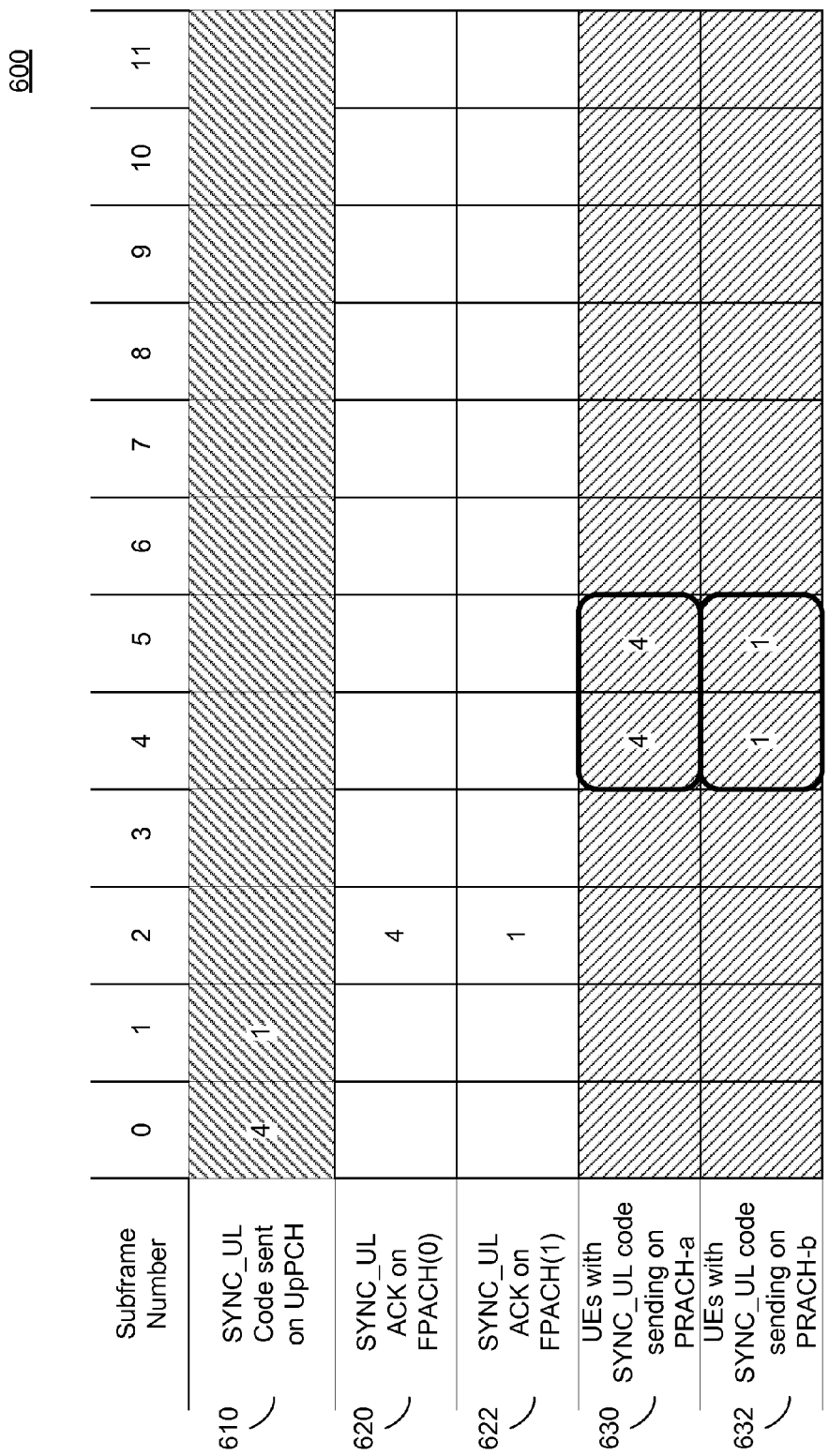
FIG. 6 is a timing diagram illustrating an example of an existing uplink (UL) synchronization and random access procedure.

FIG. 6 illustrates a timing diagram 600 of an existing UL synchronization and random access procedure in operation, where the TTI is 2 subframes (i.e., L=2), and two FPACHs (i.e., M=2): 0 and 1, where FPACH(0) 620 is for sending an ACK when the SYNC_UL code indices are 0, 2, 4, 6, and FPACH(1) 622 is for sending ACK when the SYNC_UL code indices are 1, 3, 5, 7. FPACH(0) 620 corresponds to PRACH-a 630 and FPACH(1) 622 corresponds to PRACH-b 632. That is, one PRACH per FPACH, where N(i)=1, and i=0, 1. In the example provided, the Node B may only send ACK on subframe j mod 2=0.

In FIG. 6, the first UE sends SYNC_UL code 4 in subframe 0, and the second UE sends SYNC_UL code 1 in subframe 1, with both SYNC_UL signals being sent on UpPCH 610. Then, Node B sends an ACK on FPACH(0) 620 for the SYNC_UL code 4 on FPACH(0) 620 in subframe 2 and for the SYNC_UL code 1 on FPACH(1) 622 in subframe 2. However, it would be preferable to allow a Node B to request that a UE perform UL synchronization multiple times. However, to provide for this may cause issues because the Node B may measure timing adjustment with errors and the UE may need to perform this operation repetitively to send SYNC_UL code and receive the adjustment multiple times.

Figure 7:
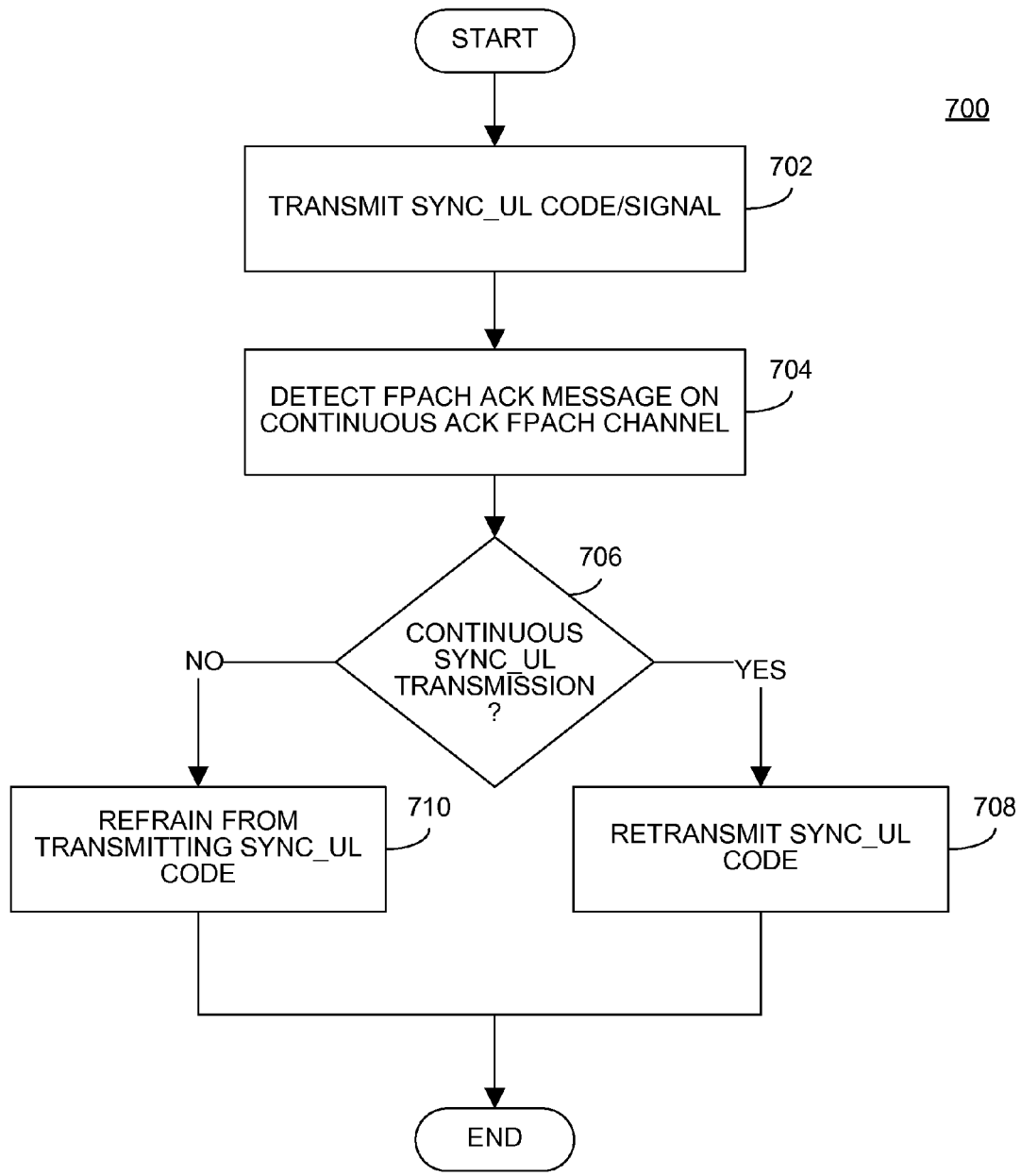
FIG. 7 illustrates a flow diagram of the operation of the communication system implementing continuous acknowledgements configured in accordance with one aspect of the disclosure

In one aspect of the disclosure, a separate FPACH is configured to signal a continuous ACK so that a UE may send SYNC_UL code repeatedly. This approach attempts to avoid affecting the existing FPACH structure defined in the current standards and also to allow backward compatibility. FIG. 7 illustrates a continuous acknowledgment procedure 700 for a UE in accordance with one aspect of the disclosure, where, in step 702, the UE will send a SYNC_UL code, or in other words, a first synchronization signal, to access the Node B.

In step 704, the UE shall monitor both the regular FPACH and the new FPACH. The new FPACH is configured for continuous ACK or repetitive SYNC_UL code transmissions, and may be referred to herein as a continuous ACK FPACH. To increase the speed of the ACK process, in the proposed approach a UE may send a SYNC_UL code in the next subframe after the subframe in which the ACK is received.

Also, in one aspect of the disclosure, the system may need to disable transmission of other UEs on the UpPCH in an attempt to ensure that there is only one UE transmitting SYNC_UL repetitively. The disclosed approach allocates one bit to disable the transmission of SYNC_UL code in the next subframe by other UEs. The revised FPACH ACK message format is as follows:

| Field | Length | Description |
| --- | --- | --- |
| Signature Reference Number | 3 (MSB) | SYNC_UL Code. |
| Relative Sub-Frame Number (LSB 2 bits) | 2 | Sub-Frame number preceding the ACK. |
| Received starting position of the UpPCH (UpPCHPOS) | 11 | Parameter used for timing correction/adjustment. |
| Transmit Power Level Command for RACH message | 7 | Used for power level command for sending RACH. |
| Disable SYNC_UL transmission flag | 1 | If flag is set to 1, then all UEs except the UE receiving on FPACH of continuous ACK shall not send SYNC_UL code. If it is to 0, then all UE follows existing procedure to send SYNC_UL code in the next subframe. |
| Reserved bits | 8 (LSB) | N/A |

As noted above, all UEs monitor the continuous ACK FPACH before sending a SYNC_UL code. Referring back to FIG. 7, in step 706, if the UE receives a revised FPACH ACK message on the continuous ACK FPACH from step 704 detects there is a continuous SYNC_UL transmission operation requested for it, then operation will continue to step 708. Otherwise, operation will continue to step 710. In one aspect of the disclosure, if a Disable SYNC_UL transmission flag (bit) that is set to a "1," all UEs except the UE receiving on the continuous ACK FPACH shall not send a SYNC_UL code. In one aspect of the disclosure, the determination of which particular UE is identified as receiving on the continuous ACK FPACH is determined by the UE matching the values in the Signature Reference Number and Relative Sub-Frame Number fields in the revised FPACH ACK message. In other words, only the UE that is designated in the ACK message will be sending a SYNC_UL code in the next subframe after receipt. If the Disable SYNC_UL transmission flag is set to "0," then all UE follows existing procedure to send SYNC_UL code in the next subframe.

In step 708, if the UE determines, in step 706, from the FPACK ACK message it received on the continuous ACK FPACH channel in step 704 that the Disable SYNC_UL transmission flag is set to "1," and that it is the UE identified by the values contained in the Signature Reference Number and Relative Sub-Frame Number fields, then the UE will retransmit the SYNC_UL code it previously transmitted. In other words, the UE will transmit another synchronization signal to the Node B.

In step 710, if the UE determines, in step 706, from the FPACK ACK message it received on the continuous ACK FPACH channel in step 704 that the Disable SYNC_UL transmission flag is set to "1," but that it is not the UE identified by the values contained in the Signature Reference Number and Relative Sub-Frame Number fields, then the UE will refrain from transmitting the SYNC_UL code it previously transmitted.

Figure 8:
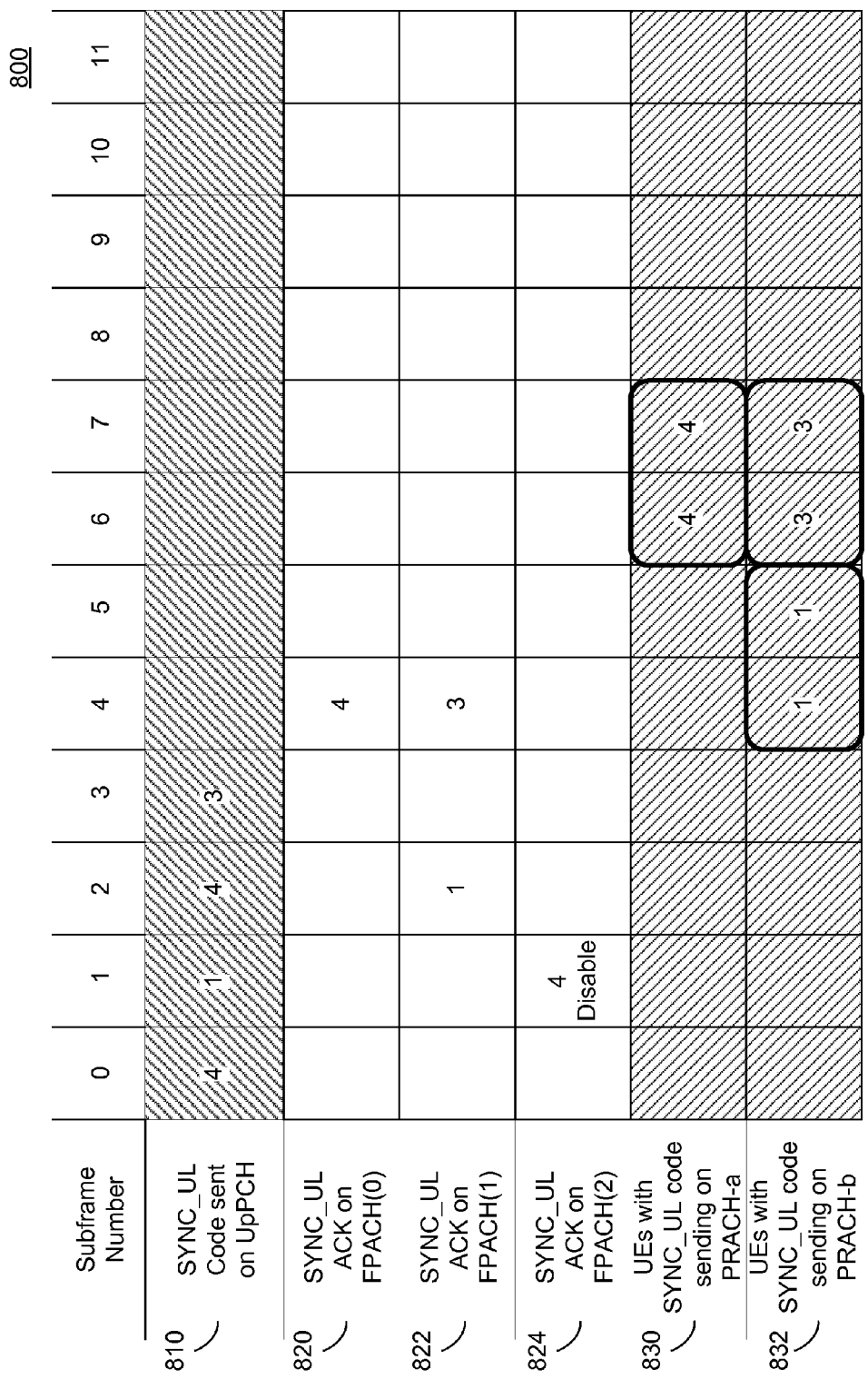
FIG. 8 is a timing diagram illustrating an example of a UL synchronization and random access procedure of FIG. 7.

FIG. 8 illustrates a timing diagram 800 with one example of an UL synchronization process implementing continuous ACK in response to UEs sending SYNC_UL codes on an UpPCH 810, where the TTI is 2 subframes (i.e., L=2), and three FPACHs: 0, 1, 2, where FPACH(0) 820 is for sending an ACK when the SYNC_UL code indices are 0, 2, 4, 6, and FPACH(1) 822 is for sending ACK when the SYNC_UL code indices are 1, 3, 5, 7. FPACH(0) 820 corresponds to PRACH-a 830 and FPACH(1) 822 corresponds to PRACH-b 832. That is, one PRACH per FPACH, where N(i)=1, and i=0, 1. The Node B may only send ACK on subframe j mod 2=0. In addition to FPACH(0) 820 and FPACH(1) 822, a separate FPACH(2) 824 is configured for continuous ACK or repetitive SYNC_UL code transmission.

In FIG. 8, the Node B decides that a first UE, which utilizes SYNC_UL code 4, shall continue synchronization procedure and sends an FPACH ACK message on FPACH(2) 824. The first UE transmits in subframe 0 and monitors FPACH(2) 824 in subsequent subframes in addition to FPACH(0) 820. When the first UE receives a matched ACK (i.e., Signature Reference Number set to "4" and Relative Sub-Frame Number set to "1") on FPACH(2) 824 in subframe 1 with Disable SYNC_UL transmission flag set to "1," it will transmit in subframe 2 again. Then the first UE continues to monitor both FPACH(0) 820 and FPACH(2) 824. This times, it does not receive any ACK on FPACH(2) 824 but receives ACK on FPACH(0) 820 in subframe 4 which means that synchronization completes. Therefore, the first UE may transmit a RACH message.

The third UE that planned to transmit in subframe 2 has detected FPACH(2) 824 includes an ACK with the Disable SYNC_UL transmission flag set in subframe 1 and therefore it does not transmit in subframe 2. But it detects no ACK on FPACH(2) 824 in subframe 2, so it will transmit an SYNC_UL code in subframe 3. Then, the third UE continues to monitor both FPACH(1) 822 and FPACH(2) 824. If the third UE now only receives an ACK message on FPACH(1) 822, this means that synchronization completes. Therefore, the third UE may transmit a RACH message.

The proposed approach may provide for repetitive SYNC_UL code transmissions, which can improve accuracy of UL synchronization and avoid failure in a later stage of random access procedure, such as during transmission of RACH messages.

Figure 9:
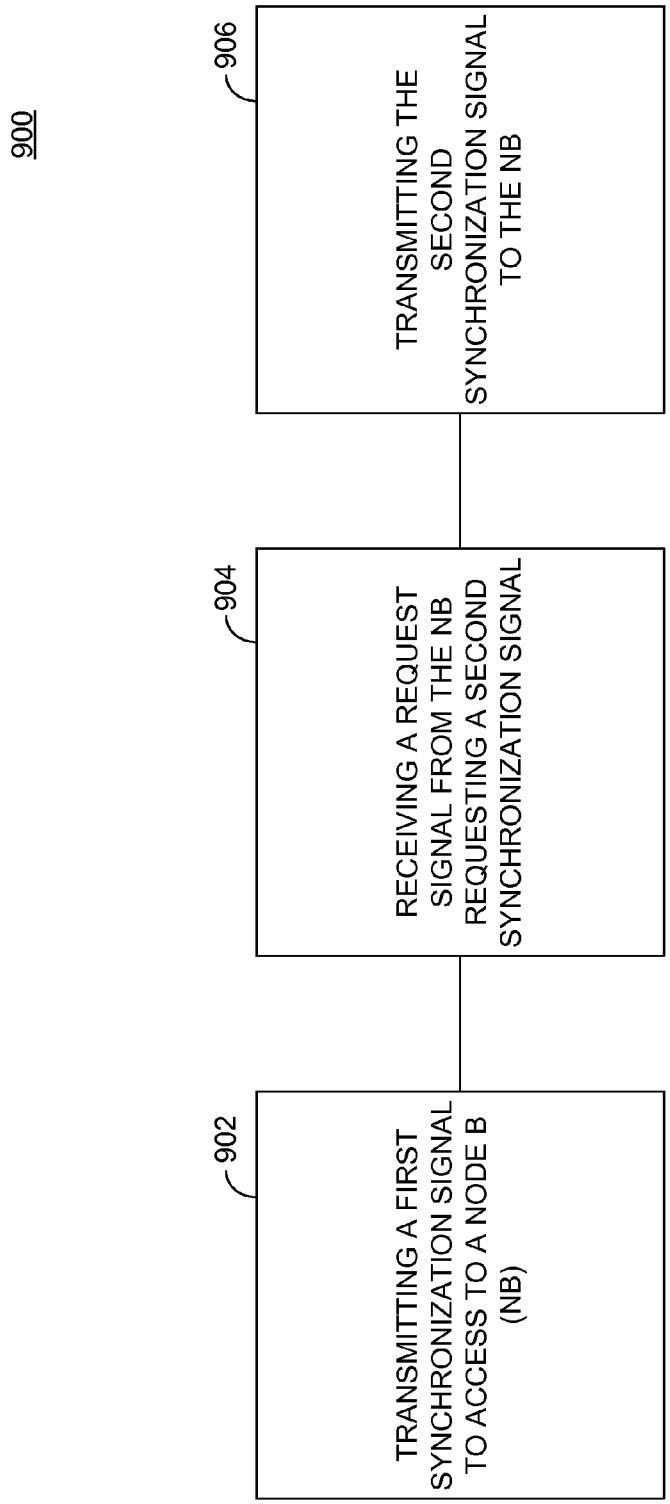
FIG. 9 is a conceptual block diagram illustrating the functionality of an exemplary UE apparatus.

FIG. 9 is a functional block diagram 900 illustrating example blocks executed in conducting wireless communication according to one aspect of the present disclosure. In block 902, transmitting a first synchronization signal to access to a Node B. In addition, block 904, receiving a request signal from the Node B requesting a second synchronization signal. Furthermore, block 906, transmitting the second synchronization signal to the Node B.

In one configuration, the apparatus 350 (of FIG. 3) for wireless communication includes means for transmitting a first synchronization signal to access to a Node B; means for receiving a request signal from the Node B requesting a second synchronization signal; and means for transmitting the second synchronization signal to the Node B. In one aspect, the aforementioned means may be the processor 390 (of FIG. 3) configured to perform the functions recited by the aforementioned means. In another aspect, the aforementioned means may be a module or any apparatus configured to perform the functions recited by the aforementioned means.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    transmitting a first synchronization signal to access a Node B;
    receiving a first request signal, via a first channel dedicated to sending the first request signal, from the Node B requesting a second synchronization signal, the first request signal having been sent based at least in part on whether the first synchronization signal was received; and
    transmitting the second synchronization signal to the Node B in response to receiving the first request signal, the first channel being different from a second channel used to transmit a second request signal for triggering a random access channel transmission.

2. The method of claim 1, wherein the first request signal comprises a transmission disabling signal for disabling transmission of synchronization signals from other user equipment (UE).

3. The method of claim 2, wherein the transmission disabling signal comprises a flag.

4. The method of claim 2, wherein the first request signal comprises a UE identifier indicating which UE is allowed to transmit synchronization signals.

5. The method of claim 1, wherein the second synchronization signal is a retransmission of the first synchronization signal.

6. The method of claim 5, wherein parameters for transmitting the second synchronization signal are based on the first request signal from the Node B.

7. The method of claim 6, wherein the first request signal comprises a timing adjustment parameter for the transmitting of the second synchronization signal.

8. The method of claim 1, wherein the first synchronization signal and the second synchronization signal comprise an identical uplink synchronization code.

9. The method of claim 1, further comprising receiving a resource assignment from the Node B based on the second synchronization signal.

10. The method of claim 1, wherein the first channel is a forward physical access channel (FPACH).

11. The method of claim 10, wherein the FPACH is configured in accordance to a TD-SCDMA standard.

12. The method of claim 1, further comprising continuously transmitting uplink codes based on the first request signal.

13. An apparatus for wireless communication, comprising:
means for transmitting a first synchronization signal to access a Node B;
means for receiving a first request signal, via a first channel dedicated to sending the first request signal, from the Node B requesting a second synchronization signal, the first request signal having been sent based at least in part on whether the first synchronization signal was received; and
means for transmitting the second synchronization signal to the Node B in response to receiving the first request signal, the first channel being different from a second channel used to transmit a second request signal for triggering a random access channel transmission.

14. The apparatus of claim 13, wherein the first request signal comprises a transmission disabling signal for disabling transmission of synchronization signals from other UE.

15. The apparatus of claim 14, wherein the transmission disabling signal comprises a flag.

16. The apparatus of claim 14, wherein the first request signal comprises a UE identifier indicating which UE is allowed to transmit synchronization signals.

17. The apparatus of claim 13, wherein the second synchronization signal is a retransmission of the first synchronization signal.

18. The apparatus of claim 17, wherein parameters for transmitting the second synchronization signal are based on the first request signal from the Node B.

19. The apparatus of claim 18, wherein the first request signal comprises a timing adjustment parameter for the transmitting of the second synchronization signal.

20. The apparatus of claim 13, wherein the first synchronization signal and the second synchronization signal comprise an identical uplink synchronization code.

21. The apparatus of claim 13, further comprising receiving a resource assignment from the Node B based on the second synchronization signal.

22. The apparatus of claim 13, wherein the first channel is a forward physical access channel (FPACH).

23. The apparatus of claim 22, wherein the FPACH is configured in accordance to a TD-SCDMA standard.

24. The apparatus of claim 13, further comprising continuously transmitting uplink codes based on the first request signal.

25. A computer program product, comprising:
a non-transitory computer-readable medium having program code recorded thereon, the program code being executed by a processor to:
transmit a first synchronization signal to access a Node B;
receive a first request signal, via a first channel dedicated to sending the first request signal, from the Node B requesting a second synchronization signal, the first request signal having been sent based at least in part on whether the first synchronization signal was received; and
transmit the second synchronization signal to the Node B in response to receiving the first request signal, the first channel being different from a second channel used to transmit a second request signal for triggering a random access channel transmission.

26. The computer program product of claim 25, wherein the first request signal comprises a transmission disabling signal for disabling transmission of synchronization signals from other UE.

27. The computer program product of claim 26, wherein the transmission disabling signal comprises a flag.

28. The computer program product of claim 26, wherein the first request signal comprises a UE identifier indicating which UE is allowed to transmit synchronization signals.

29. The computer program product of claim 26, wherein parameters of the for-transmitting the second synchronization signal are based on the first request signal from the Node B.

30. The computer program product of claim 29, wherein the first request signal comprises a timing adjustment parameter for the transmitting of the second synchronization signal.

31. The computer program product of claim 25, wherein the second synchronization signal is a retransmission of the first synchronization signal.

32. The computer program product of claim 25, wherein the first synchronization signal and the second synchronization signal comprise an identical uplink synchronization code.

33. The computer program product of claim 25, further comprising receiving a resource assignment from the Node B based on the second synchronization signal.

34. The computer program product of claim 25, wherein the first channel is a forward physical access channel (FPACH).

35. The computer program product of claim 34, wherein the FPACH is configured in accordance to a TD-SCDMA standard.

36. The computer program product of claim 25, further comprising continuously transmitting uplink codes based on the first request signal.

37. An apparatus for wireless communication, comprising:
a processing system configured to:
transmit a first synchronization signal to access a Node B;
receive a first request signal, via a first channel dedicated to sending the first request signal, from the Node B requesting a second synchronization signal, the first request signal having been sent based at least in part on whether the first synchronization signal was received; and
transmit the second synchronization signal to the Node B in response to receiving the first request signal, the first channel being different from a second channel used to transmit a second request signal for triggering a random access channel transmission.

38. The apparatus of claim 37, wherein the first request signal comprises a transmission disabling signal for disabling transmission of synchronization signals from other user equipment (UE).

39. The apparatus of claim 38, wherein the transmission disabling signal comprises a flag.

40. The apparatus of claim 38, wherein the first request signal comprises a UE identifier indicating which UE is allowed to transmit synchronization signals.

41. The apparatus of claim 35, wherein parameters for transmitting the second synchronization signal are based on the first request signal from the Node B.

42. The apparatus of claim 41, wherein the first request signal comprises a timing adjustment parameter for the transmitting of the second synchronization signal.

43. The apparatus of claim 37, wherein the second synchronization signal is a retransmission of the first synchronization signal.

44. The apparatus of claim 37, wherein the first synchronization signal and the second synchronization signal comprise an identical uplink synchronization code.

45. The apparatus of claim 37, further comprising receiving a resource assignment from the Node B based on the second synchronization signal.

46. The apparatus of claim 37, wherein the first channel is a forward physical access channel (FPACH).

47. The apparatus of claim 46, wherein the FPACH is configured in accordance to a TD-SCDMA standard.

48. The apparatus of claim 37, further comprising continuously transmitting uplink codes based on the first request signal.

* * * * *